April 1, 1958     W. J. HARPER     2,829,265
ELECTRODE STRUCTURE FOR IMAGING DEVICE
Filed Nov. 23, 1954
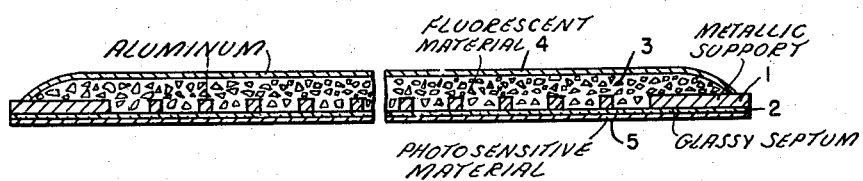
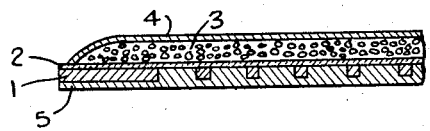
WITNESSES:
INVENTOR
Walter J. Harper.
BY
ATTORNEY United States Patent Office 2,829,265
Patented Apr. 1, 1958

2,829,265

ELECTRODE STRUCTURE FOR IMAGING DEVICE

Walter J. Harper, Wilkins Township, Allegheny County, Pa., assignor to Westinghouse Electric Corporation, East Pittsburgh, Pa., a corporation of Pennsylvania Application November 23, 1954, Serial No. 470,681

8 Claims. (Cl. 250—80)

My invention relates to photoelectric image screens and in particular relates to a novel structure for image screens comprising a layer of fluorescent material separated by a glass septum from a layer of photoelectrically-emissive material which makes feasible a much thinner glass layer than has been possible with prior art screens.

In certain types of electron-optical devices, such, for example, as the X-ray image intensifier described in Mason et al. Patent 2,523,132, an X-ray or other radiation pattern projected onto a fluorescent screen generates therein a light pattern which passes through a thin layer of glass and generates a corresponding pattern of emitted electrons at the surface of a thin layer of photoelectrically-emissive material covering the obverse face of the glass. The glass permits a certain amount of scattering of the light pattern it transmits, in amount roughly proportional to its thickness; so it is desirable to make the glass as thin as is consistent with mechanical strength. For example, the thinnest glass that is usable in practice for a screen about six inches in diameter has been found to be about six mils; and larger-diameter screens have to be correspondingly thicker. From the optical standpoint such dimensions are undesirably great in many instances, and my present invention is directed to obtaining screen structures of adequate mechanical strength in which the glass-thickness is much smaller.

One object of my invention is accordingly to provide an improved optical screen embodying separated parallel layers of fluorescent material and photoelectrically-emissive material.

Another object is to provide a structure for optical screens of the type embodying a fluorescent layer and a photoelectrically-emissive layer separated by a thin layer of glass which provides adequate mechanical strength even though the glass layer is extremely thin.

Another object is to provide a novel type of screen of the type embodying a fluorescent surface and a photoelectric surface separated by a layer of transparent material which is not dependent on strength of either of said layers to withstand the stresses incident to its use.

Another object is to provide a novel screen in which a phosphor layer and a photoelectric layer are protected from chemically reacting by a chemically inert septum of minimum feasible thickness.

Other objects of my invention will become apparent upon reading the following description taken in connection with the drawings in which Figure 1 is a schematic sectional view of an optical screen constructed in accordance with one embodiment of my invention; and Figure 2 is a schematic sectional view of a portion of an optical screen constructed in accordance with another embodiment of my invention.

Referring in detail to Figure 1, which is a schematic sectional view for explanation purposes and not intended to indicate relative dimensions of its layers, the optical screen of my invention is formed on a screen or gridwork 1 which may be of nickel, copper or other suitable metal, and may, for instance, be about five microns thick for screens two inches in diameter, and slightly thicker for larger diameters. The mesh may be chosen to suit the intended use, but a mesh of around five hundred per inch having sixty to eighty percent open area is one useful for many purposes. On such a framework, there may be laid down by methods well known a thin film of nitrocellulose or other organic material, and a septum 2 of glassy material be deposited on the organic film by evaporation in vacuum. The following materials may be thus evaporated to form the glassy septum: germanium oxide ($GeO_2$), silicon monoxide (SiO), calcium silicate ($CaSiO_3$), calcium fluoride ($CaF_2$), barium fluoride ($BaF_2$), magnesium fluoride ($MgF_2$). A thickness of one micron will suffice for most purposes. After this deposition the organic layer is removed by baking. A layer 3 of fluorescent material such as zinc-cadium sulphide may then be deposited on one surface of the septum 2, a thickness of the order of five to ten microns being suitable for many purposes. A film 4 of aluminum, deposited by evaporation to a thickness of about one thousand Angstroms will be found valuable in many instances.

A layer 5 of cesiated antimony or other desired photoelectric material may be deposited on the free surface of the septum 2 by methods well known in the art after the screen has been installed in an evacuated container. One suitable method of depositing a photoelectric material such as cesiated antimony is that disclosed in column 6, lines 47–54 of the above-mentioned Mason et al. Patent 2,523,132.

Figure 2 is similar to Figure 1 except that the glassy septum 2 is on the opposite side of the metallic grid 1 from the photoelectric layer 5 whereas in Fig. 1, the glassy septum 2 is on the same side of the metallic grid 1 as the photoelectric layer 5. In both embodiments shown, however, the glassy septum 2 separates the photoelectric layer 5 from the fluorescent layer 3.

I claim as my invention:

1. An optical screen comprising a foraminated metallic support plate, a substantially imperforate glassy septum supported on one side of said plate, a layer of fluorescent material on the supported side of said septum and a coating of photoelectric material on the other side thereof.

2. An optical screen comprising a foraminated metallic support plate, a substantially imperforate glassy septum supported on one side of said plate, a layer of fluorescent material on the supported side of said septum and a coating of photoelectric material on the other side thereof, said layer of fluorescent material being coated with aluminum.

3. An optical screen comprising a foraminated metallic support plate, a substantially imperforate glassy septum supported on one side of said plate, said septum consisting of one or more materials selected from the group consisting of $GeO_2$, $CaSiO_3$, $CaF_2$, $BaF_2$ and $MgF_2$, a layer of fluorescent material on the supported side of said septum and a coating of photoelectric material on the other side thereof, said fluorescent material being a zinc sulphide phosphor and said photoelectric material being cesiated antimony.

4. An optical screen comprising a foraminated metallic support plate, a substantially imperforate glassy septum supported on one side of said plate, said septum consisting of one or more materials selected from the group consisting of $GeO_2$, $CaSiO_3$, $CaF_2$, $BaF_2$ and $MgF_2$, a layer of fluorescent material on the supported side of said septum and a coating of photoelectric material on the other side thereof, said layer of fluorescent material being coated with aluminum.

5. An optical screen comprising a foraminated metallic support plate, a substantially imperforate glassy septum supported on one side of said plate, said septum consisting of one or more materials selected from the group consisting of $GeO_2$, $CaSiO_3$, $CaF_2$, $BaF_2$ and $MgF_2$, a layer of fluorescent material on the supported side of said septum and a coating of photoelectric material on the other side thereof.

6. A screen member comprising an apertured metallic support member having a thickness of about 5 microns, a substantially imperforate glassy septum having a thickness of about 1 micron supported on one side of said metallic plate thereby forming a separating and supporting structure, a layer of fluorescent material on one side of said structure and a layer of photoemissive material on the other side of said structure.

7. The method of forming a screen which consists of laying down on a metallic grid a film of thermally removable organic material, depositing on said film a substantially imperforate septum consisting of one or more materials selected from the group consisting of $GeO_2$, SiO, $CaSiO_3$, $CaF_2$, $BaF_2$ and $MgF_2$, eliminating said film by heating, depositing a layer of fluorescent material on one side of said septum and coating the other side of said septum with a photoelectric material.

8. The method of forming a screen which consists of laying down on a metallic grid a film of thermally removable organic material, depositing on said film a substantially imperforate septum consisting of one or more materials selected from the group consisting of $GeO_2$, SiO, $CaSiO_3$, $CaF_2$, $BaF_2$, and $MgF_2$, eliminating said film by heating, depositing a layer of fluorescent material on one side of said septum and coating the other side of said septum with a photoelectric material, said fluorescent material being a zinc sulphide phosphor and said photoelectric material being cesiated antimony.

References Cited in the file of this patent

UNITED STATES PATENTS

| | | |
|---|---|---|
| 2,055,017 | Praetorius et al. | Sept. 22, 1936 |
| 2,125,599 | Batchelor | Aug. 2, 1938 |
| 2,312,229 | Anderson | Feb. 23, 1943 |
| 2,476,590 | Evans | July 19, 1949 |
| 2,507,958 | Cassman | May 16, 1950 |
| 2,523,132 | Mason et al. | Sept. 19, 1950 |
| 2,549,072 | Epstein | Apr. 17, 1951 |
| 2,579,772 | Wilder | Dec. 25, 1951 |
| 2,594,740 | De Forest et al. | Apr. 29, 1952 |
| 2,687,492 | Szegho et al. | Aug. 24, 1954 |
| 2,689,189 | Hushley | Sept. 14, 1954 |
| 2,689,190 | Hushley | Sept. 14, 1954 |

FOREIGN PATENTS

| | | |
|---|---|---|
| 672,205 | Great Britain | May 14, 1952 |